(No Model.)

T. C. NIXON.
PIPE COUPLING.

No. 582,022.          Patented May 4, 1897.

Witnesses          Inventor
A. Whiting          Thomas C. Nixon.
Lena Kester.    By his Attorney
         Rufus B. Fowler.

UNITED STATES PATENT OFFICE.

THOMAS C. NIXON, OF WORCESTER, MASSACHUSETTS.

PIPE-COUPLING.

SPECIFICATION forming part of Letters Patent No. 582,022, dated May 4, 1897.

Application filed June 15, 1896. Serial No. 595,519. (No model.)

*To all whom it may concern:*

Be it known that I, THOMAS C. NIXON, a citizen of the United States, residing at Worcester, in the county of Worcester and State of Massachusetts, have invented a new and useful Improvement in Pipe-Couplings, of which the following is a specification, accompanied by drawings forming a part of the same, and in which—

Figure 1:
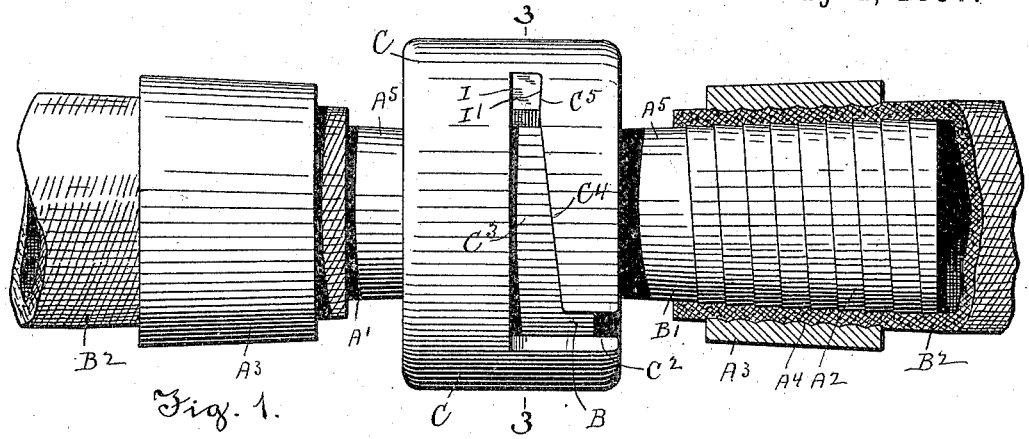
Figure 2:
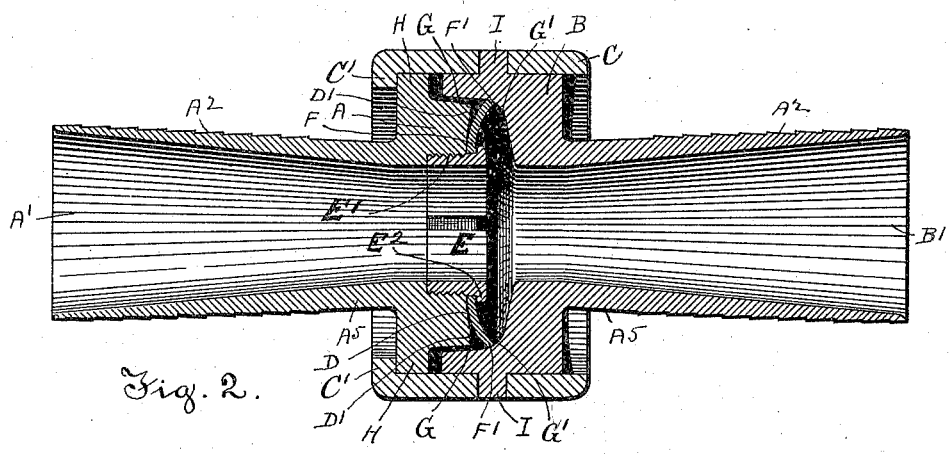
Figure 3:
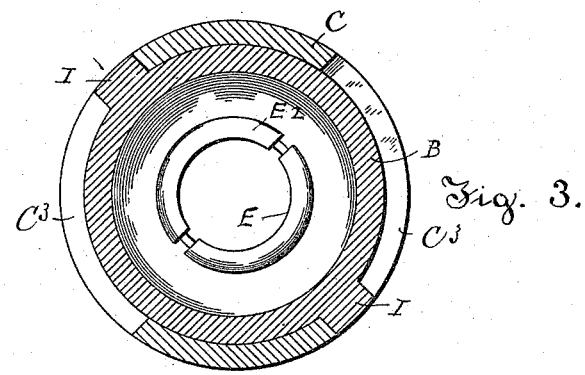

Figure 1 shows a side view of a pipe-coupling embodying my invention and represented as uniting two ends of a flexible or hose pipe. Fig. 2 is a central longitudinal sectional view, and Fig. 3 is a transverse sectional view on line 3 3, Fig. 1.

Similar letters refer to similar parts in the different figures.

Referring to the drawings, A and B denote the two members of a coupling embodying my invention, and C denotes a coupling-ring by which the two members are united.

The two members A and B are formed on the ends of the pipes A' and B', which when the coupling is to be used with flexible or hose pipes are made slightly flaring and provided with a ratchet-shaped spiral screw-thread, as represented at $A^2$, Fig. 1, thereby allowing the end of the flexible or hose pipe $B^2$ to be screwed upon the flaring section of pipe and retained in position by means of a ring $A^3$, which is slightly flaring to correspond with the flaring section of pipe and is provided on its inner surface with a spiral screw-thread $A^4$, having a corresponding pitch to the spiral thread $A^2$, but having each thread slightly rounded on its face, so as not to present any angular or cutting edges to the outer surface of the hose-pipe.

In order to apply the hose-pipe $B^2$, the ring $A^3$ is moved over the smallest section or neck $A^5$ of the pipe and the end of the hose is screwed upon the flaring section, and the ring $A^3$ is then screwed back over the end of the hose-pipe, the rounded internal screw-thread of the ring causing the hose-pipe to be pressed against the ratchet-shaped screw-thread $A^2$, thereby preventing the hose-pipe $B^2$ from being pulled off.

The member A of the coupling is provided with a concave seat D, surrounded at its edge by a narrow border D', lying in a plane at right angles to the axis of the pipe. The member A is provided with a central screw-thread at E' to receive a screw-threaded thimble E, having a lip $E^2$, which overlaps the inner edge of the concave seat D, and between the lip $E^2$ and the seat D, I clamp the inner edge of an annular gasket F, which is dished or stamped into the form of a spherical arc having a less radius than the concave seat D, so that the outer edge F' of the gasket will be raised above the seat.

The member B is cup-shaped and incloses the gasket F and seat D, the side wall G being slightly flaring to enable it to pass readily over the edge of the gasket, and at the inner end of the side wall G the surface is curved, forming a circular arc G', with the center of the arc in contact with the outer edge F' of the gasket when the two members A and B are placed together in position to be clamped by the action of the coupling-ring C. The coupling-ring C is provided with an interior flange C', which engages the outer edge of a flange H, formed on the member A, and the opposite edge of the ring is provided with notches $C^2$ on diametrically opposite sides, one of said notches being shown in Fig. 1.

On the member B are studs I, projecting radially and on diametrically opposite sides and adapted to enter the notches $C^2$ in the coupling-ring C when the members are brought together. The notches $C^2$ communicate with slots $C^3$, into which the studs I I are carried by the rotation of the ring.

One side of the slot $C^3$ is provided with the inclined surface $C^4$, which is moved past the stud I by the rotation of the ring, thereby acting as a cam-surface to draw the members A and B closely together.

At the end of the slots $C^3$ the continuation of the side $C^4$ forms an oppositely-inclined surface to the surface $C^4$, and the outer sides of the studs I I are beveled, as at I', at a corresponding angle to the inclined surface $C^5$, so that when the studs I I are carried into the ends of the slots by the rotation of the ring C the beveled surface I' will rest against the inclined surface $C^5$ and hold the ring against reverse movement.

As the members A and B are drawn forcibly together the arc G' will be drawn into close contact with the outer edge F' of the gasket, tending to compress the gasket toward the center of the pipe and also tending to move the edge of the gasket toward the seat.

Any movement of the edge of the gasket toward the seat will tend to change the form of the gasket from a spherical arc to a plane surface, thereby increasing its diameter and consequently increasing the pressure of its outer edge F' against the arc G'. The strain exerted upon the edge of the gasket will therefore increase its pressure against the inner wall of the member B in whatever direction the strain is exerted.

The gasket F may consist of a disk of rubber, copper, or steel, or any other suitable material, as may be determined by the uses to which the coupling is applied.

I do not claim, broadly, the employment of a notched coupling-ring forming what is commonly known as a "bayonet-joint;" but by the form of notched ring as above shown and described I am able, by the simple rotation of the ring, to apply a powerful force to compress the edge of the gasket, to lock the ring against accidental displacement, and to release the coupling by applying sufficient force to reverse the motion of the coupling-ring. The inner edge of the surface D affords a means of attachment for the inner edge of the annular gasket, and the outer edge D' serves as a stop for gasket as it is moved toward the seat by the action of the arc G', but there is no compression between two opposing clamping-surfaces, as in the pipe-couplings in ordinary use. The packing takes place between the arc G' and the outer edge of the gasket and is effected whether the curved surface of the arc G' moves over the edge F' or carries the edge F' with it. In the former case the compression is direct, and in the latter it is caused by the expansion or increase in diameter of the gasket.

What I claim as my invention, and desire to secure by Letters Patent, is—

1. The combination in a pipe-coupling, of a member supporting a concave gasket, an annular gasket in the form of a spherical arc, a clamping device by which the inner edge of said annular gasket is clamped to said member, an opposing cup-shaped member inclosing said gasket and having a concave surface arranged to bear against the outer edge of said gasket and means for drawing said members together whereby said gasket is compressed in the direction of its width, substantially as described.

2. In a pipe-coupling the combination of the members A and B, said member A having a concave seat D, an annular gasket F in the form of a spherical arc, a screw-threaded thimble E having a lip $E^2$ by which the inner edge of said gasket is clamped to said member A, a cup-shaped member B having a flaring side wall G and a concave section G' arranged to bear against the outer edge of said annular gasket and means for drawing said members together whereby said gasket is compressed in the direction of its width, substantially as described.

3. In a pipe-coupling comprising coupled members and means for uniting said members, the flaring section of pipe A', larger at the end farthest from said coupled members and having a spiral ratchet-shaped thread $A^2$ combined with a correspondingly-flaring ring having an internal rounded screw-thread, substantially as described.

4. The combination in a pipe-coupling of a pipe provided with a flaring section having a ratchet-shaped spiral thread, and a flaring ring provided with an internal spiral thread of corresponding pitch, said internal thread having a rounded face, substantially as described.

Dated this 12th day of June, 1896.

THOMAS C. NIXON.

Witnesses:
RUFUS B. FOWLER,
LENA KESTER.